United States Patent
Chow et al.

(10) Patent No.: US 9,373,126 B2
(45) Date of Patent: Jun. 21, 2016

(54) MATCHING ADVERTISING TO GAME PLAY CONTENT

(75) Inventors: Michael Chow, San Francisco, CA (US); Justin Rouse, Dallas, TX (US); Kevin Holme, Allen, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,858

(22) Filed: Sep. 26, 2011

(65) Prior Publication Data
US 2012/0252574 A1    Oct. 4, 2012

Related U.S. Application Data

(63) Continuation of application No. 13/079,148, filed on Apr. 4, 2011, now Pat. No. 9,256,888.

(51) Int. Cl.
*A63F 9/24* (2006.01)
*G06Q 30/02* (2012.01)
*H04L 29/06* (2006.01)

(52) U.S. Cl.
CPC ............ *G06Q 30/0251* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 1,599,460 A * | 9/1926 | Craze | 283/56 |
| 3,941,388 A | 3/1976 | Isaac et al. | |
| 5,018,975 A | 5/1991 | Todd | |
| 5,197,884 A * | 3/1993 | Roemer et al. | 434/178 |
| 5,823,879 A * | 10/1998 | Goldberg et al. | 463/42 |
| 5,918,213 A * | 6/1999 | Bernard et al. | 705/26.35 |
| 5,941,772 A * | 8/1999 | Paige | 463/20 |
| 6,061,660 A * | 5/2000 | Eggleston et al. | 705/14.12 |
| 6,196,920 B1 * | 3/2001 | Spaur et al. | 463/42 |
| 6,749,511 B2 * | 6/2004 | Day | 463/42 |
| 7,054,830 B1 * | 5/2006 | Eggleston et al. | 705/14.26 |
| 7,054,831 B2 * | 5/2006 | Koenig | 705/14.5 |
| 7,266,509 B2 * | 9/2007 | Koenig | 705/14.5 |
| 7,455,586 B2 * | 11/2008 | Nguyen et al. | 463/16 |
| 7,729,946 B2 | 6/2010 | Chu | |
| 7,792,698 B1 * | 9/2010 | Veach et al. | 705/14.71 |
| 8,029,359 B2 | 10/2011 | Cheng | |

(Continued)

FOREIGN PATENT DOCUMENTS

| | | |
|---|---|---|
| WO | WO-2006005073 A2 | 1/2006 |
| WO | WO-2006071246 A1 | 7/2006 |
| WO | WO-2012138786 A1 | 10/2012 |

OTHER PUBLICATIONS

"Review: Words with Friends for iPhone/iPod Touch", Joe Tomasone, 1 page, Dec. 7, 2009.*

(Continued)

*Primary Examiner* — Paul A D'Agostino
(74) *Attorney, Agent, or Firm* — Schwegman Lundberg & Woessner, P.A.

(57) ABSTRACT

An advertisement is associated with a particular user move in a gaming environment where playing of the user move by a user results in the advertisement being displayed at the user's gaming device. With multiple users, each play of a unique user move results in a corresponding uniquely targeted advertisement being displayed at the respective gaming device of each user. User moves and associated advertisements are bound to one another based on a frequency of use of the user move in game play and the desirability of the advertiser to associate the advertisement with the user move.

16 Claims, 9 Drawing Sheets

(56) References Cited

U.S. PATENT DOCUMENTS

| | | | |
|---|---|---|---|
| 8,065,286 B2 | 11/2011 | Jones | |
| 8,180,672 B2 | 5/2012 | Curtis et al. | |
| 8,272,964 B2 | 9/2012 | Van Datta et al. | |
| 8,328,642 B2 | 12/2012 | Mosites et al. | |
| 8,449,385 B2 | 5/2013 | Mosites et al. | |
| 8,491,380 B2 | 7/2013 | Mosites et al. | |
| 8,655,731 B2 | 2/2014 | Bosarge et al. | |
| 8,682,839 B2 | 3/2014 | Li et al. | |
| 9,009,154 B2 | 4/2015 | Rinckes et al. | |
| 9,152,984 B1 | 10/2015 | Schoettler et al. | |
| 9,256,888 B2 | 2/2016 | Chow et al. | |
| 2002/0013174 A1* | 1/2002 | Murata | 463/42 |
| 2002/0022516 A1 | 2/2002 | Forden | |
| 2002/0065746 A1* | 5/2002 | Lewis | 705/27 |
| 2002/0082910 A1* | 6/2002 | Kontogouris | 705/14 |
| 2002/0087403 A1 | 7/2002 | Meyers et al. | |
| 2002/0155891 A1* | 10/2002 | Okada et al. | 463/42 |
| 2002/0193099 A1* | 12/2002 | Paulsen | 455/414 |
| 2003/0103644 A1* | 6/2003 | Klayh | 382/100 |
| 2003/0141660 A1* | 7/2003 | Colapinto et al. | 273/143 R |
| 2003/0181242 A1* | 9/2003 | Lee et al. | 463/42 |
| 2003/0230848 A1* | 12/2003 | Mellerowicz | 273/272 |
| 2004/0148221 A1 | 7/2004 | Chu | |
| 2005/0033771 A1* | 2/2005 | Schmitter et al. | 707/104.1 |
| 2005/0091106 A1* | 4/2005 | Reller et al. | 705/14 |
| 2005/0137015 A1 | 6/2005 | Rogers et al. | |
| 2005/0202862 A1* | 9/2005 | Shuman et al. | 463/9 |
| 2006/0009284 A1* | 1/2006 | Schwartz et al. | 463/30 |
| 2006/0063580 A1* | 3/2006 | Nguyen et al. | 463/16 |
| 2006/0063587 A1* | 3/2006 | Manzo | 463/25 |
| 2006/0085261 A1 | 4/2006 | Chu | |
| 2006/0116194 A1* | 6/2006 | Pacey et al. | 463/20 |
| 2006/0128469 A1* | 6/2006 | Willis et al. | 463/42 |
| 2006/0135232 A1 | 6/2006 | Willis | |
| 2006/0148573 A1 | 7/2006 | Willis et al. | |
| 2006/0178918 A1 | 8/2006 | Mikurak | |
| 2006/0259473 A1* | 11/2006 | Li et al. | 707/3 |
| 2007/0072678 A1 | 3/2007 | Dagres | |
| 2007/0078706 A1 | 4/2007 | Datta et al. | |
| 2007/0087810 A1 | 4/2007 | Walker et al. | |
| 2007/0130015 A1 | 6/2007 | Starr et al. | |
| 2007/0142106 A1 | 6/2007 | Proch et al. | |
| 2007/0174258 A1* | 7/2007 | Jones et al. | 707/3 |
| 2007/0226062 A1* | 9/2007 | Hughes et al. | 705/14 |
| 2007/0265090 A1* | 11/2007 | Barsness et al. | 463/42 |
| 2008/0016040 A1* | 1/2008 | Jones et al. | 707/3 |
| 2008/0065481 A1 | 3/2008 | Immorlica et al. | |
| 2008/0097822 A1* | 4/2008 | Schigel et al. | 705/10 |
| 2008/0102947 A1* | 5/2008 | Hays et al. | 463/31 |
| 2008/0114642 A1* | 5/2008 | Goldberg et al. | 705/10 |
| 2008/0147497 A1* | 6/2008 | Tischer | 705/14 |
| 2008/0167106 A1* | 7/2008 | Lutnick et al. | 463/16 |
| 2008/0256061 A1 | 10/2008 | Chang et al. | |
| 2008/0275755 A1* | 11/2008 | Brustein et al. | 705/10 |
| 2008/0288345 A1* | 11/2008 | Hirsch | 705/14 |
| 2008/0300060 A1* | 12/2008 | Tomita | 463/42 |
| 2008/0306826 A1 | 12/2008 | Kramer et al. | |
| 2009/0006375 A1 | 1/2009 | Lax et al. | |
| 2009/0018905 A1* | 1/2009 | Roberts | 705/14 |
| 2009/0054140 A1 | 2/2009 | Beser et al. | |
| 2009/0069078 A1* | 3/2009 | Nguyen et al. | 463/25 |
| 2009/0094138 A1 | 4/2009 | Sweitzer et al. | |
| 2009/0124311 A1 | 5/2009 | Sandberg | |
| 2009/0124384 A1* | 5/2009 | Smith et al. | 463/42 |
| 2009/0156310 A1* | 6/2009 | Fargo | 463/42 |
| 2009/0164287 A1* | 6/2009 | Kies et al. | 705/8 |
| 2009/0167766 A1 | 7/2009 | Porter et al. | |
| 2009/0197681 A1 | 8/2009 | Krishnamoorthy et al. | |
| 2009/0198573 A1 | 8/2009 | Fox | |
| 2009/0198576 A1 | 8/2009 | Rogers, Jr. | |
| 2009/0204706 A1 | 8/2009 | Ertugrul et al. | |
| 2009/0217319 A1* | 8/2009 | Weiss | 725/34 |
| 2009/0239663 A1* | 9/2009 | Ferdinand et al. | 463/29 |
| 2009/0247282 A1* | 10/2009 | Cheng | 463/25 |
| 2009/0259531 A1 | 10/2009 | Van Zwol et al. | |
| 2009/0265163 A1* | 10/2009 | Li et al. | 704/10 |
| 2009/0298594 A1 | 12/2009 | Pueyo et al. | |
| 2010/0005489 A1* | 1/2010 | Losey | 725/35 |
| 2010/0016080 A1 | 1/2010 | Garden et al. | |
| 2010/0017283 A1 | 1/2010 | Hamilton, II et al. | |
| 2010/0022310 A1 | 1/2010 | Van Datta et al. | |
| 2010/0042619 A1* | 2/2010 | Jones et al. | 707/5 |
| 2010/0069151 A1* | 3/2010 | Suchocki | 463/31 |
| 2010/0130276 A1 | 5/2010 | Fiden et al. | |
| 2010/0131355 A1 | 5/2010 | Kitchen et al. | |
| 2010/0160046 A1* | 6/2010 | Prusack | 463/40 |
| 2010/0161406 A1* | 6/2010 | Narayan Vedam | 705/14.41 |
| 2010/0174593 A1 | 7/2010 | Cao et al. | |
| 2010/0185687 A1* | 7/2010 | Chung et al. | 707/803 |
| 2010/0203952 A1 | 8/2010 | Zalewski | |
| 2010/0211431 A1 | 8/2010 | Lutnick et al. | |
| 2010/0332331 A1 | 12/2010 | Etchegoyen | |
| 2011/0041153 A1* | 2/2011 | Simon et al. | 725/46 |
| 2011/0065421 A1 | 3/2011 | Gluck et al. | |
| 2011/0106630 A1 | 5/2011 | Hegeman et al. | |
| 2011/0159940 A1* | 6/2011 | Acres | 463/11 |
| 2011/0295678 A1 | 12/2011 | Seldin et al. | |
| 2011/0312423 A1 | 12/2011 | Mosites et al. | |
| 2012/0015716 A1 | 1/2012 | Mosites et al. | |
| 2012/0015717 A1 | 1/2012 | Mosites et al. | |
| 2012/0016726 A1 | 1/2012 | Mosites et al. | |
| 2012/0047017 A1 | 2/2012 | Hernandez et al. | |
| 2012/0108306 A1* | 5/2012 | Munsell et al. | 463/9 |
| 2012/0252557 A1 | 10/2012 | Chow et al. | |
| 2012/0252559 A1 | 10/2012 | Chow et al. | |
| 2012/0252573 A1 | 10/2012 | Chow et al. | |
| 2012/0270615 A1 | 10/2012 | Jones et al. | |
| 2012/0270650 A1 | 10/2012 | Jones et al. | |
| 2012/0278173 A1 | 11/2012 | Vaidyanathan et al. | |
| 2013/0102393 A1 | 4/2013 | Willis | |
| 2013/0232000 A1 | 9/2013 | van Datta et al. | |
| 2013/0232001 A1 | 9/2013 | van Datta et al. | |
| 2014/0248943 A1 | 9/2014 | Burgin et al. | |
| 2014/0316870 A1 | 10/2014 | Burgin et al. | |

OTHER PUBLICATIONS

"Words with Friends App", New Channel! iTECH244!, 2 pages, uploaded to You Tube TM Jan. 3, 2010 at https://www.youtube.com/watch?v=hNqj2WGd6T4 last accessed by Examiner on Nov. 17, 2015.*

"Words With Friends" ,2 pages, Apr. 1, 2010, located at iPhoneAppDemos.tv at http://iphoneappdemos.tv/2010/04/words-with-friends/last accessed by Examiner on Nov. 17, 2015.*

Words with Friends—Asynchronous Online Scrabble, Eli Hodapp, 2 pages, Jul. 21, 2009, located at http://t~ucharcade.c~m/2~~9/~7/21/w~rds-with-friends-asynchr~n~us~n~ine-scrabb~e/ last accessed by Examiner on Nov. 17, 2015.*

"U.S. Appl. No. 13/244,739, Final Office Action mailed Apr. 30, 2012", 10 pgs.

"U.S. Appl. No. 13/244,861, Response filed Apr. 25, 2012 to Non Final Office Action mailed Jan. 25, 2012", 18 pgs.

"U.S. Appl. No. 13/244,739, Examiner Interview Summary mailed Feb. 7, 2012", 8 pgs.

"U.S. Appl. No. 13/244,739, Non Final Office Action mailed Jan. 19, 2012", 11 pgs.

"U.S. Appl. No. 13/244,739. Non Final Office Action Response filed Apr. 19, 2012 response to Non Final Office Action mailed Jan. 19, 2012", 14 pgs.

"U.S. Appl. No. 13/244,861, Examiner Interview Summary Mailed Feb. 9, 2012", 8 pgs.

"U.S. Appl. No. 13/244,861, Non Final Office Action mailed Jan. 25, 2012", 12 pgs.

"U.S. Appl. No. 13/244,739, Advisory Action mailed Jul. 11, 2012", 4 pgs.

"U.S. Appl. No. 13/244,739, Response filed Jul. 2, 2012 to Final Office Action mailed Apr. 30, 2012", 17 pgs.

"U.S. Appl. No. 13/244,739, Response filed Oct. 30, 2012 to Advisory Action mailed Apr. 30, 2012", 16 pgs.

"U.S. Appl. No. 13/244,861, Final Office Action mailed Jun. 1, 2012", 13 pgs.

(56) References Cited

OTHER PUBLICATIONS

"U.S. Appl. No. 13/079,148, Examiner Interview Summary mailed Apr. 17, 2013", 3 pgs.
"U.S. Appl. No. 13/079,148, Non Final Office Action mailed Dec. 18, 2012", 18 pgs.
"U.S. Appl. No. 13/079,148, Response filed May 20, 2013 to Non Final Office Action mailed Dec. 18, 2012", 31 pgs.
"U.S. Appl. No. 13/244,739, Non Final Office Action mailed Dec. 7, 2012", 10 pgs.
"U.S. Appl. No. 13/244,739, Response filed Apr. 8, 2013 to Non Final Office Action mailed Dec. 7, 2012", 17 pgs.
"U.S. Appl. No. 13/244,861 , Response filed Dec. 3, 2012 to Final Office Action mailed Jun. 1, 2012", 19 pgs.
"International Application Serial No. PCT/US2012/032209, International Search Report mailed Jun. 29, 2012", 4 pgs.
"International Application Serial No. PCT/US2012/032209, Written Opinion mailed Jun. 29, 2012", 9 pgs.
"U.S. Appl. No. 13/079,148, Examiner Interview Summary mailed Aug. 25, 2014", 3 pgs.
"U.S. Appl. No. 13/079,148, Response filed Sep. 2, 2014 to Non-Final Office Action dated May 2, 2014", 27 pgs.
"U.S. Appl. No. 13/174,763, Response filed Aug. 25, 2014 to Final Office Action mailed May 23, 2014", 15 pgs.
"U.S. Appl. No. 13/244,739, Examiner Interview Summary mailed Aug. 25, 2014", 3 pgs.
"U.S. Appl. No. 13/244,739, Response filed Sep. 9, 2014 to Non-Final Office Action dated May 9, 2014", 13 pgs.
"U.S. Appl. No. 13/244,861, Examiner Interview Summary mailed Aug. 25, 2014", 3 pgs.
"U.S. Appl. No. 13/244,861, Response filed Aug. 25, 2014 to Non-Final Office Action dated Apr. 25, 2014", 19 pgs.
"U.S. Appl. No. 13/720,280, Examiner Interview Summary mailed Sep. 17, 2014", 3 pgs.
"U.S. Appl. No. 13/720,280, Response filed Sep. 16, 2014 to Final Office Action dated Jul. 10, 2014", 10 pgs.
"U.S. Appl. No. 13/079,148, Final Office Action mailed Sep. 25, 2013", 15 pgs.
"U.S. Appl. No. 13/079,148, Non Final Office Action mailed May 2, 2014", 18 pgs.
"U.S. Appl. No. 13/079,148, Response filed Jan. 27, 2014 to Final Office Action dated Sep. 25, 2013", 17 pgs.
"U.S. Appl. No. 13/174,763, Final Office Action mailed May 23, 2014", 23 pgs.
"U.S. Appl. No. 13/174,763, Non Final Office Action mailed Oct. 2, 2013", 22 pgs.
"U.S. Appl. No. 13/174,763, Response filed Feb. 10, 2014 to Non Final Office Action mailed Oct. 2, 2013", 16 pgs.
"U.S. Appl. No. 13/244,739, Final Office Action mailed Sep. 19, 2013", 12 pgs.
"U.S. Appl. No. 13/244,739, Non Final Office Action mailed May 9, 2014", 12 pgs.
"U.S. Appl. No. 13/244,739, Response filed Mar. 19, 2014 to Final Office Action mailed Sep. 19, 2013", 12 pgs.
"U.S. Appl. No. 13/244,861, Non Final Office Action mailed Apr. 25, 2014", 15 pgs.
"U.S. Appl. No. 13/549,252, Examiner Interview Summary mailed Aug. 12, 2014", 3 pgs.
"U.S. Appl. No. 13/549,252, Non Final Office Action mailed Jun. 18, 2014", 21 pgs.
"U.S. Appl. No. 13/549,252, Response filed Aug. 8, 2014 to Non Final Office Action mailed Jun. 18, 2004", 11 pgs.
"U.S. Appl. No. 13/720,280, Final Office Action mailed Jul. 10, 2014", 14 pgs.
"U.S. Appl. No. 13/720,280, Non Final Office Action mailed Nov. 26, 2013", 15 pgs.
"U.S. Appl. No. 13/720,280, Preliminary Amendment mailed Jan. 8, 2014", 3 pgs.
"U.S. Appl. No. 13/720,280, Response filed Apr. 28, 2014 to Non Final Office Action mailed Nov. 26, 2013", 10 pgs.
"U.S. Appl. No. 13/720,361, Final Office Action mailed Jun. 4, 2014", 13 pgs.
"U.S. Appl. No. 13/720,361, Non Final Office Action mailed Nov. 20, 2013", 14 pgs.
"U.S. Appl. No. 13/720,361, Response filed Mar. 19, 2014 to Non-Final Office Action dated Nov. 20, 2013", 9 pgs.
"U.S. Appl. No. 14/194,657, Preliminary Amendment mailed", 10 pgs.
"International Application Serial No. PCT/US2012/032209, International Preliminary Report on Patentability mailed Oct. 17, 2013", 9 pgs.
"U.S. Appl. No. 13/079,148, Final Office Action mailed Nov. 7, 2014", 17 pgs.
"U.S. Appl. No. 13/174,763, Non Final Office Action mailed Feb. 20, 2015", 25 pgs.
"U.S. Appl. No. 13/244,739, Final Office Action mailed Nov. 6, 2014", 14 pgs.
"U.S. Appl. No. 13/244,861, Final Office Action mailed Nov. 6, 2014", 17 pgs.
"U.S. Appl. No. 13/549,252, Final Office Action mailed Feb. 24, 2015", 24 pgs.
"U.S. Appl. No. 13/549,252, Non Final Office Action mailed Sep. 23, 2014", 22 pgs.
"U.S. Appl. No. 13/549,252, Response filed Dec. 2, 2014 to Non-Final Office Action dated Sep. 23, 2014", 13 pgs.
"U.S. Appl. No. 13/720,280, Non Final Office Action mailed Oct. 1, 2014", 15 pgs.
"U.S. Appl. No. 13/720,280, Response filed Dec. 23, 2014 to Non-Final Office Action dated Oct. 1, 2014", 13 pgs.
"U.S. Appl. No. 13/720,361, Examiner Interview Summary mailed Feb. 20, 2015", 4 pgs.
"U.S. Appl. No. 13/720,361, Non Final Office Action mailed Nov. 6, 2014", 24 pgs.
"U.S. Appl. No. 13/720,361, Response filed Feb. 16, 2015 to Non Final Office Action mailed Nov. 6, 2014", 15 pgs.
"U.S. Appl. No. 13/720,361, Response filed Oct. 6, 2014 to Final Office Action dated Jun. 4, 2014", 9 pgs.
"U.S. Appl. No. 13/079,148, Non Final Office Action mailed Apr. 2, 2015", 23 pgs.
"U.S. Appl. No. 13/079,148, Response filed Mar. 9, 2015 to Final Office Action mailed Nov. 7, 2014", 15 pgs.
"U.S. Appl. No. 13/079,148, Response filed Oct. 1, 2015 to Non Final Office Action mailed Apr. 2, 2015", 21 pgs.
"U.S. Appl. No. 13/174,763, Final Office Action mailed Sep. 29, 2015", 30 pgs.
"U.S. Appl. No. 13/174,763, Response filed Jul. 20, 2015 to Non Final Office Action mailed Feb. 20, 2015", 35 pgs.
"U.S. Appl. No. 13/244,739, Non Final Office Action mailed Apr. 2, 2015", 18 pgs.
"U.S. Appl. No. 13/244,739, Response filed Mar. 6, 2015 to Final Office Action mailed Nov. 6, 2014", 13 pgs.
"U.S. Appl. No. 13/244,739, Response filed Oct. 1, 2015 to Non Final Office Action mailed Apr. 2, 2015", 16 pgs.
"U.S. Appl. No. 13/244,861, Examiner Interview Summary mailed Aug. 3, 2015", 3 pgs.
"U.S. Appl. No. 13/244,861, Non Final Office Action mailed Apr. 2, 2015", 20 pgs.
"U.S. Appl. No. 13/244,861, Response filed Mar. 6, 2015 to Final Office Action mailed Nov. 6, 2014", 15 pgs.
"U.S. Appl. No. 13/244,861, Response filed Oct. 1, 2015 to Non Final Office Action mailed Apr. 2, 2015", 17 pgs.
"U.S. Appl. No. 13/549,252, Examiner Interview Summary mailed Apr. 21, 2015", 3 pgs.
"U.S. Appl. No. 13/549,252, Notice of Allowance mailed May 26, 2015", 10 pgs.
"U.S. Appl. No. 13/549,252, Response filed Apr. 20, 2015 to Final Office Action mailed Feb. 24, 2015", 12 pgs.
"U.S. Appl. No. 13/720,280, Final Office Action mailed Mar. 17, 2015", 18 pgs.
"U.S. Appl. No. 13/720,361, Examiner Interview Summary mailed Jul. 27, 2015", 4 pgs.
"U.S. Appl. No. 13/720,361, Final Office Action mailed Apr. 28, 2015", 16 pgs.

(56) References Cited

OTHER PUBLICATIONS

"U.S. Appl. No. 13/720,361, Non Final Office Action mailed Sep. 18, 2015", 15 pgs.

"U.S. Appl. No. 13/720,361, Response filed Jul. 28, 2015 to Final Office Action mailed Apr. 28, 2015", 14 pgs.

U.S. Appl. No. 13/079,148, filed Apr. 4, 2011, Matching Advertising to Game Play Content.

U.S. Appl. No. 13/244,739, filed Sep. 26, 2011, Matching Advertising to Game Play Content.

U.S. Appl. No. 13/244,861, filed Sep. 26, 2011, Matching Advertising to Game Play Content.

U.S. Appl. No. 13/079,148, Notice of Allowance mailed Nov. 30, 2015, 10 pgs.

U.S. Appl. No. 13/079,148, Supplemental Notice of Allowability mailed Jan. 11, 2016, 2 pgs.

U.S. Appl. No. 13/244,739, Final Office Action mailed Jan 5, 2016, 8 pgs.

U.S. Appl. No. 13/244,861, Notice of Allowance mailed Jan. 6, 2016, 6 pgs.

U.S. Appl. No. 13/720,361, Response filed Jan. 19, 2016 to Non Final Office Action mailed Sep. 18, 2015, 16 pgs.

U.S. Appl. No. 14/194,666, Non Final Office Action mailed Oct. 7, 2015, 9 pgs.

* cited by examiner

MATCHING ADVERTISING TO GAME PLAY CONTENT

CROSS-REFERENCE TO RELATED PATENT DOCUMENTS

This patent application claims a priority benefit and is a continuation of U.S. patent application Ser. No. 13/079,148, filed on Apr. 4, 2011, and entitled "MATCHING ADVERTISING TO GAME PLAY CONTENT"; which is incorporated herein by reference in its entirety.

TECHNICAL FIELD

The present disclosure relates to games and applications in general, and in particular, to computer-implemented online games playable on mobile devices.

BACKGROUND

In many games, there is a virtual world or some other imagined playing space where a game player controls one or more player characters (herein "character," "player character," or "PC"). Player characters may be considered in-game representations of the controlling player. As used here, the terms "player," "user," "entity," and "friend" may refer to the in-game player character controlled by that player, user, entity, or friend, unless context suggests otherwise. A game display may display a representation of the player character. A game engine accepts inputs from the player, determines player character actions, decides outcomes of events, and presents the player with a game display illuminating what happened. In some games, there are multiple players, wherein each player controls one or more player characters.

Internet users typically access online games using browser clients (e.g., Firefox®, Google Chrome™, Internet Explorer®, etc). Many mobile client devices cellular phones, personal digital assistants, computer tablets, etc.) can access and run various computer games via the Internet. Mobile client users typically access online games by using the browser clients or custom applications.

Typically users may also incorporate a browser client to handle many aspects of their online interests and daily activities including e-mail (e.g., Gmail™ webmail service, Yahoo! Mail™, GMX™ Mail, etc.), information searches by online search providers (e.g., Google Search, Bling™, Yahoo!™ Search, etc.), shopping (e.g., Google Shopping™, Amazon-.com™,), and social networking (Facebook®, LinkedIn®, Twitter®).

Any of these online browsing environments may serve online advertisements to users during the course of their pursuits of online activities. One common approach for triggering the serving of an online advertisement is for a browser or online application to determine a user's location and display an advertisement with some correlation to the determined location. Another trigger of online display advertisements may be the content of personal e-mail, which many users may consider to be intrusive.

BRIEF DESCRIPTION OF DRAWINGS

Some embodiments are illustrated by way of example and not by way of limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Environment

Figure 1:
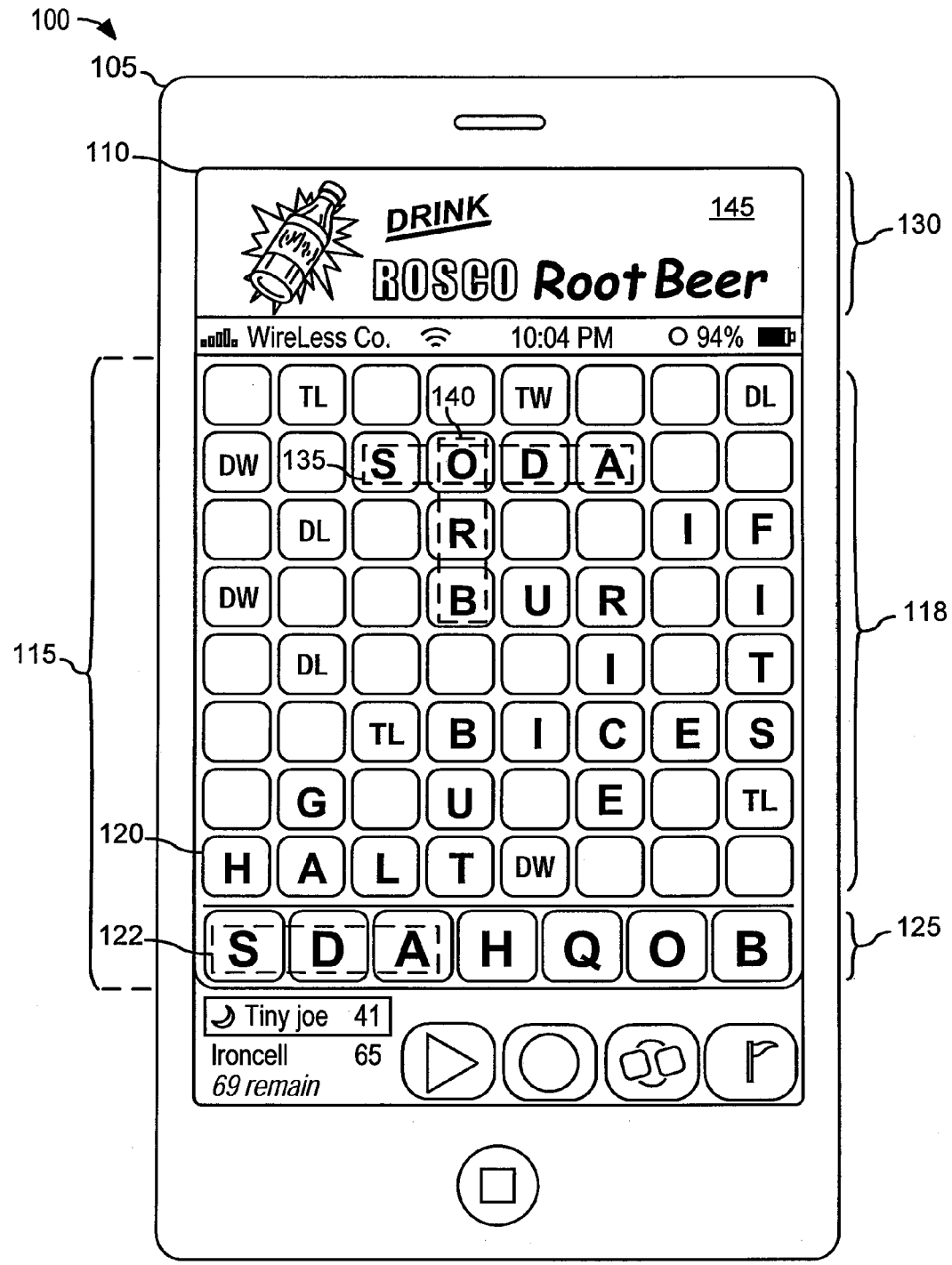
FIG. 1 is a device diagram illustrating a screen image of an advertisement displayed during game play on a mobile device, according to an example embodiment.

FIG. 1 depicts a mobile device 100, such as a cell phone 105, engaged in an online game session as a client device. The cell phone 105 may incorporate a touch screen 110 to display images of game play and facilitate user interaction. A main game play area 115 may display a primary game play board area 118, which may be a word game for example, where words may be spelled out from letter tiles 120 available from a tile rack 125. Each of two or more players may take turns spelling new words from their available letter tiles 122 where a new word includes at least one letter tile 120 associated with a previously played word to form the newly spelled word. A user may select a letter to play by applying a finger tip on the touch screen 110 over an available letter tile 120 in the tile rack 125, The letter tile 120 may then be dragged to an unoccupied tile position in the game play board area 118 while continuous contact is maintained with the finger on the touch screen 110.

In a user move, a succession of letter tiles 122 may be selected from the tile rack 125 and moved to a line of adjacent unoccupied tile positions to spell a complete word, Upon completion of spelling an entire word, an advertisement may be presented in an ad banner 130 in an upper portion of the touch screen 110, The content of the advertisement may be related to the user move.

In the present embodiment, a user has selected a succession of letters S-D-A 122 to spell the word "SODA" 135 horizontally across the beginning of the word "ORB" 140 in an upper portion of the touch screen 110. The word "SODA" 135 may be associated with an advertisement for a branded soft drink, such as the hypothetical "Rosco Root Beer" brand, Playing the user move S-D-A 122 to spell "SODA" 135 may cause the "Drink Rosco Root Beer" advertisement 145 to be displayed in the ad banner 130 at the mobile device 100, After a new word may be completely spelled out, a next player proceeds with their turn to try and spell another word.

The preceding embodiment of a word game may be an example of one type of game play involving a user move by a player that may involve the display of an advertisement associated with the user move. The advertisement may be associated with a most recent user move and have advertising content relating to the content or context of the user move. For example, spelling out the word "shirt" may cause the display of an advertisement for laundry detergent.

Embodiments of game play triggering related advertisements are not limited to a single user. Multiple users may be playing the same game and each user's game play may trigger separate advertisements which may be displayed at the respective mobile device 100 of each user. In other embodiments it may be possible that a general promotional advertisement may be displayed to one or more users to prompt a certain type of user moves on the part of users in game play which may in turn relate to a product being promoted.

System

Figure 2:
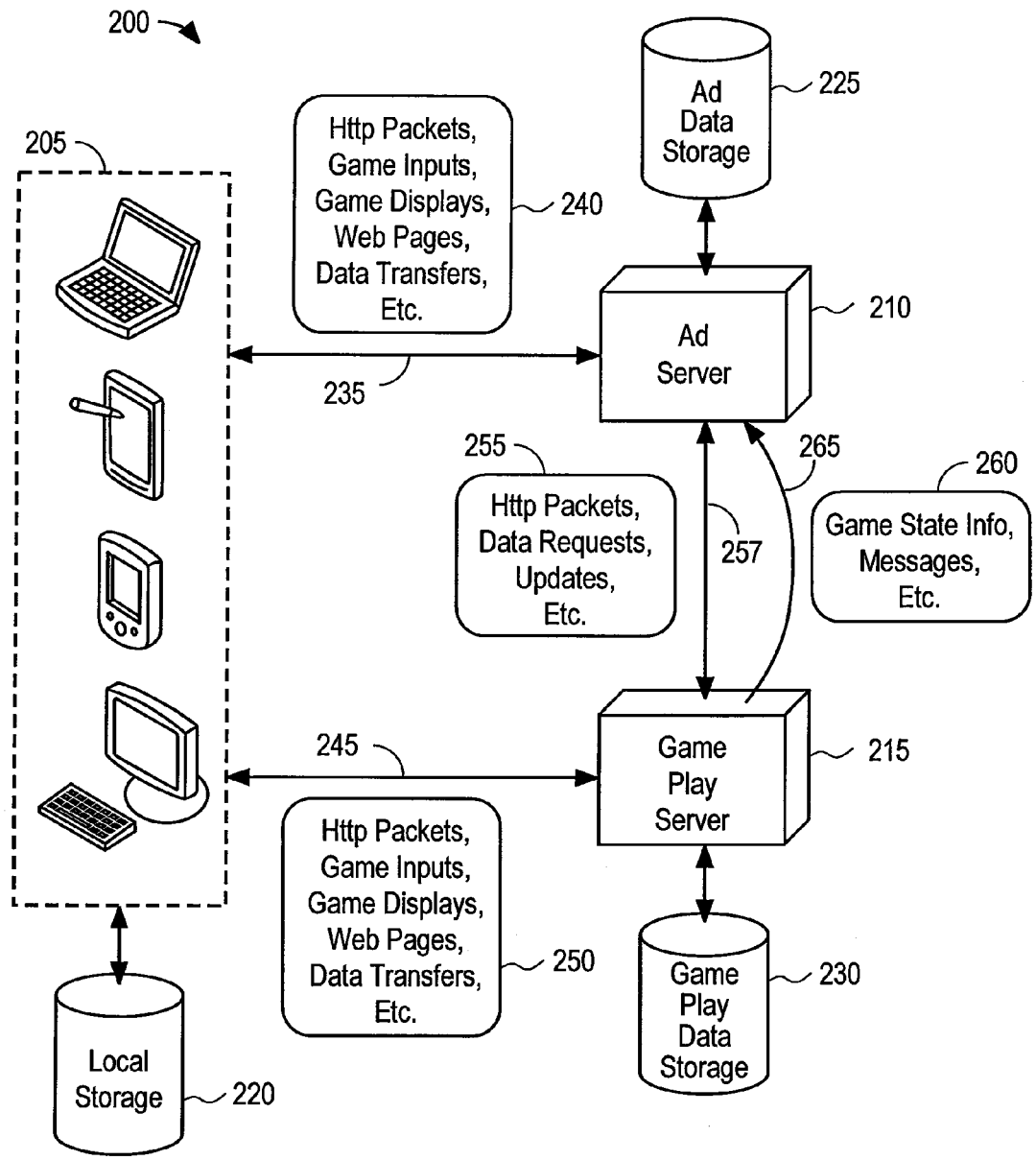
FIG. 2 is a system diagram of an advertisement networking system electrically coupled to example client devices and a gaming network system, according to an example embodiment.

FIG. 2 depicts a block diagram and data flow between components of a gaming system 200. The gaming system 200 may include a selection of a client device 205, an ad server 210 and game play server 215. The client device 205 may be a laptop personal computer (PC), a tablet computer, a cell phone, a personal digital assistant, or a desk-side or test-top PC. The client device 205, the ad server 210, and the game play server 215 may each have a corresponding data stores such as local storage 220, ad data storage 225 and game play data storage 230, respectively. The client device 205 may use an ad network 235 to communicate with the ad server 210 to transmit and/or receive advertisement data 240 (e.g., game inputs, advertisements, incentive offer information, data transfers, etc.). Additionally, the client device 205 may use a game play network 245 to communicate with the game play server 215 to transmit and/or receive game play data 250 (e.g., game inputs, user moves, data transfers, HyperText Transfer Protocol [HTTP] packets, game displays, web pages, etc.).

In a similar fashion, the ad server 210 and the game play server 215 may communicate HTTP packets 255 (e.g., data requests, ad related information, game play information, updates, etc.) between one another over a server network 257 connected between the ad server 210 and the game play server 215. At some other time, or at the same time, the game play server 215 may communicate game data 260 (e.g., game state information, user move information, game type, game system account information, page info, messages, etc.) over a game state network 265 to the ad server 210.

Communication between client device 205, ad server 210 and game play server 215 may occur over any appropriate electronic communication medium or network using any suitable communication protocol. For example, the client device 205, as well as various servers of the systems described, herein, may include Transport Control Protocol/Internet Protocol (TCP/IP) networking stacks to provide for datagram and transport functions. Of course, any other suitable network and transport layer protocols may be utilized.

In addition, hosts or end-systems described herein may use a variety of higher layer communications protocols, including client-server (or request-response) protocols, such as HTTP and other communications protocols, such as HTTP-S, file transfer protocol FTP, simple network management protocol SNMP, the Internet and local area network protocol TELNET, and a number of other protocols, may be used. In addition, a server in one interaction context may be a client in another interaction context. Still further, in particular implementations, the information transmitted between hosts may be formatted as HyperText Markup Language (HTML®) documents. Other structured document languages or formats may be used, such as extensible markup language XML®, and the like. Executable code objects, such as JavaScript® and ActionScript®, may also be embedded in the structured documents.

In some client-server protocols, such as the use of HTML® over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML® page, which itself refers to other data objects. A client application, such as a browser, will request these additional data objects as it parses or otherwise processes the first data object.

The example data flows in this section are presented with respect to data flow between advertisement networking systems and game networking systems. One skilled in the art would appreciate that these are presented merely as an example of a data flow between two types of online systems. However, the present disclosure may be intended to encompass data flows between a game networking system and a variety of other online systems, such as online media systems, online reviewing systems, online search engines, and online advertising systems. The example data flows described, herein function analogously with these online systems as with advertisement networking systems.

It may be recognized by one skilled in the art, that the example data flow and general communication channels described herein as networks in this section may lend, themselves to being implemented as a self-contained offline system. The communication channels and the corresponding data described herein may be conceived of being transmitted in a directly coupled off-line system which may electrically couple similar system elements as those described.

User moves may be entered by a user at the client device 205. Generally, a user move may be an action on the part of a player to trigger an action, event, or outcome in game play. For example, a user move may be the playing of a game element, placement of one or more letter tiles in a board area of a word game, or a placement of a player character to trigger an in-game event. Each of the user moves entered by a user at the client device 205 may be received by the ad server 210 in a game play session. The moves may be received by redirection from the game play server 215 or directly from the client device 205. The ad server 210, in response to receiving the user move, may search a database of stored user moves stored in the ad data storage 225 to compare the user move with a stored selection of user moves. If a match is detected by the ad server 210, the user move may be determined to be a stored user move. It may also be said that if the received user move matches a stored user move, the stored user move may be determined to have been "played."

The ad server 210 may determine that the stored user move has been used in the game and that an advertisement stored in the database and associated with the stored user move may be retrieved. A link contained in the data structure and stored with the stored user move may be used to locate the corresponding advertisement, which may also known as a display advertisement. The display advertisement may be transmitted to the client device 205 engaged in the game session. The client device 205 displays the advertisement within the gaming session.

Game play may involve multiple users each making user moves that trigger associated advertisements. The ad server 210 during the course of game play may receive location information (further explained below) from the client device 205 of each player. Each user's identifier and respective location information may be maintained by the ad server 210. When an advertisement is triggered by a user move, the location information may be utilized in determining the device location for the advertisement to be transmitted to. In this way multiple users may each be making independent user moves and receive associated advertisements at their individual client device 205 independent of other users. An advertiser may also be assured that their particular advertisement may be directed to users and to user moves associated with the advertisement they may have purchased. This segregation of user, user move and associated advertisement assures that multiple advertisers may purchase advertisements within the same game and have their respective user moves and associated advertisement interactions played out independent of any other advertiser.

In some embodiments, the stored user move may constitute the playing of a word and an informational advertisement containing information related to the word may be transmitted to the client device 205 for display when the stored user move is played. The informational advertisement may contain word-related information such as a definition, a grammatical fact, and an etymological fact. Such informational advertisements may be sponsored by an associated advertiser. The display of the informational advertisement may include the corresponding advertiser's logo or branding information subtly displayed as part of the information in the advertisement. Such display advertising may be far less intrusive to the user than conventional advertising based on location or personal user information.

In order to determine the likelihood that a given user move will be used in game play, an online game company desiring to facilitate online display advertisements, for example, may track play of the user move by a set of users within a sample of online game sessions. An online game, that may be representative of a published game or the published game itself, may be initiated by the online game company to provide a sample session environment. A representative number of users may be recruited to play the online game. The representative number of users may be selected to be large enough for their play to represent typical users of an online gaming community and their game play statistically reflects nominal usage of various user moves.

All of the user moves used in game play by the representative users may be tracked or only a set of candidate user moves may be tracked for a targeted advertising campaign. A calculation of the frequency of use of each user move used in game play within the online game session sample may be kept in a database within the server system. A calculation of the frequency of use of the user move may be blade by calculating the number of times a user move may be played during a specific period of time, such as the sample game play sessions. Alternatively, the calculation of the frequency of use of a user move may be taken from the total number of user moves received over the entirety of a game. The threshold may be established by an advertiser or a gaining producer, for example.

The data structure used in storing a game play word may also include space for a link to a stored advertisement. The actual stored advertisement may be determined at a later time and not be known at the time that the calculation may be taken and the game play word placed in storage. The advertisement may be associated with a selected user move at a later time.

The association of the advertisement with the user move may be carried out by the advertiser or the gaming provider. The association may be carried out by populating the link in the user move data structure (or "associating data structure") with an address of the advertisement in the database of the ad data storage 225. Filling in the database link may associate the user move with the advertisement and thus may make the advertisement a "stored advertisement" indicating that the stored advertisement may be the target of an association with the linked user move. Additionally, multiple user moves may be associated with multiple stored advertisements within an ad campaign. Also, more than one user move may be associated with the same stored advertisement. Additionally, more than one advertiser may purchase the same user move and therefore more than one advertisement may be associated with the same user move.

Once an advertisement is determined to be a stored advertisement it may literally be stored on any of the local data stores described above, namely the local storage 220, the ad data storage 225 and the game play data storage 230 of the client device 205, the ad server 210, and the game play server 215 respectively. While the ad storage offered by the ad server 210 may typically be the primary storage location for stored advertisements and candidate advertisements; stored ads, and alternatively candidate advertisements, may also be stored in a local cache, along with all or a portion of the linking data structure at either the game play data storage 230 or the local storage 220.

In the case of keeping the stored advertisements in the game play data storage 230, the game play server 215 may receive user moves that trigger stored advertisements kept in the game play data storage 230. Having stored advertisements corresponding to a particular game stored in the game play data storage 230 may avoid the need to contact the ad server 210 for each ad as well as avoid the latency such interaction with the ad server 210 may cause.

A particular game may be preconfigured with pre-cached advertisements stored locally in the game play data storage 230 of the game play server 215. In this way, the game application may be pre-configured and later run independently from the ad server 210. In the case of gaming devices advertisement pre-configuration and caching may allow a mobile device to continue game play with advertisements when an independent connection to the ad server 210 is lost or temporarily interrupted, Additionally, only the stored advertisements may be initially configured and pre-cached in decentralized locations such as the game play data storage 230 and the local storage 220 and at some later time the associating data structure (advertisement triggers) may be downloaded and incorporated with the stored advertisements as new advertising campaigns are fulfilled.

Alternatively, the pre-caching approach may be incorporated into completely independent and off-line devices used in standalone game play. For example, stored advertisements and associated advertisement triggers may be pre-cached at the local storage 220 of a client device 205 that has been configured in a prior connection and later operates autonomously and off-line from either the game play server 215 or the ad server 210. In this way, a completely autonomous game play session, including all advertisement implementation, maybe carried out by a remotely operating game play device.

In yet a further alternate embodiment, the associating data structure may be pre-cached at a storage location away from the ad data storage 225 such as the game play data storage 230 or the local storage 220. In this way, the advertisement trigger may be stored and detected locally at either the client device 205 or in the game play server 215. In so doing, each of the devices may transmit a request for a corresponding stored advertisement during a game play session after identifying a stored user move corresponding to an advertisement trigger. In an even further alternative, pre-cached advertisement triggers residing on a client device 205 may later be linked to later downloaded advertisements to be locally cached with corresponding advertisement triggers. Regardless of whether the client device 205 is operating in an online or standalone mode, pre-cached advertisements and corresponding advertisement triggers may be kept in the local storage 220 with or without a corresponding downloaded application. Additionally, advertisements and advertisement triggers may be pre-cached without any predefined game application association and may later be bound to a particular game by user selection and/or purchase.

Alternately, the game play server 215 may manage the use in game play of the associating data structure and link. When a user move triggers a stored advertisement the game play server 215 may determine the stored advertisement utilizing the link contained in the associating data structure and request the stored advertisement directly from the ad server 210.

A particular user move or a set of user moves that have been tracked and a total frequency of use determined in sample game play sessions may be presented to an advertiser as candidate advertisement triggers. Each candidate advertisement trigger may contain a user move along with the respective frequency of use. The advertiser may have a particular product believed to have a certain appeal to the typical player of the online game. The product may have a close association with one or more user moves typically used in the online game, or a close association with the game itself. The advertiser may review the game play user moves tracked in the sample online game sessions along with the respective associated frequency of use and determine which user move may make a suitable advertisement trigger for their product.

Once an advertiser determines that a user move (or user moves) matches their requirements for association with their product or brand, the candidate advertisement trigger may be purchased by the advertiser. The advertiser may purchase the user move and have exclusive rights to the user move in the associated online game for triggering the advertisement. Alternatively the same user move may be sold for exclusive use in a separate game to a further advertiser. Additionally, a gaming producer may sell the same user move to multiple advertisers within the same game. Prioritization and arbitration between advertisers situations may be incorporated when multiple advertisers may have purchased the same user move in the same game. The advertiser may already have the intended display advertisement or may be planning to produce an advertisement associated with the user move and the corresponding online game. Knowing the frequency of use, the advertiser has an expectation of how often the user move will be used in general game play and how often their product may be promoted by the display of the linked advertisement when the game play user move is purchased for a given game.

On the other hand, a gaming producer may receive an advertising proposal from a prospective advertiser. The proposal may include at least one proposed user move to be considered for becoming a stored user move to be used in game play. The gaming producer may search the database of stored user moves and if the proposed user move is determined to be a stored user move, then retrieve the frequency of use of the stored user move corresponding to the proposed user move. When the frequency of use of the stored user move exceeds a minimum threshold, the gaming producer may propose an advertising campaign to the prospective advertiser. The minimum threshold may be selected for commercial viability reasons, as too low of a threshold may mean that not enough revenue may be generated to justify pursuit of.

An advertiser may be charged for the general sponsoring of the stored advertisement. Sponsorship of the ad may include acquiring the rights to the user move, associating the advertisement with the user move, and covering the expenses in determining the user move frequency of use. The advertiser may also be charged each time the stored advertisement is transmitted for display to the client device 205 or each time the user move triggers the associated stored advertisement. Each time the stored advertisement is triggered, a count may be kept in the associated database as part of the advertisement related usage information. In the case of the ad server 210 managing the association of game play content with advertisement content, usage information such as the total count of triggering clicks by user moves may be kept in the database residing in the ad data storage 225. Alternatively, the game play server may manage the association of game play content with advertisement content and keep the corresponding usage information in the game play data storage 230.

During game play, a user move may correspond with and invoke more than one advertisement. For instance, a user move of the word "earphone" in a word game, made by adding "E-A-R-P-H" to the word "ONE" may trigger a stored advertisement for a stereo (corresponding to the word "earphone") and a further stored advertisement for a cell phone (corresponding to the word "phone"). A prioritization between the advertisements may be undertaken to determine an optimal advertisement to display to the user according to a selection criterion.

During the course of a game play session, the ad server 210 may receive the selection criterion as a part of game play data transmitted from the game play server 215, for example. The game play data may include, in addition to the selection criterion, such things as a further user move, a game type identifier, a corresponding user move frequency of use, and a game play location.

The selection criterion may be used by the ad server 210 to determine the optimal advertisement to be sent to the user who has played the user move that triggered multiple advertisements. The selection criterion may be a set of instructions and/or standards used by the ad server 210 to differentiate one advertisement over another. The selection criterion may be one or more of a maximum price per click of a corresponding advertisement trigger, a maximum purchase price paid for the ad, a maximum price between the ads paid to purchase a corresponding advertising campaign. Additionally, the selection criterion may include an optimal relationship ranking of a corresponding advertiser of the ad, the frequency of use of the user move triggering the ad, the ad's not being recently displayed, and simple random selection.

Where a user move has triggered more than one advertisement, each of the advertisements may be retrieved from a database contained in the ad data storage 225 and assessed by the ad server according to the selection criterion. For example, the purchase price paid for a first ad may be compared to the purchase price paid for a second ad and the maximum purchase price paid may determine which ad may be transmitted to the client device 205 for display.

Alternatively, where more than one selection criterion data may be available, a first type of selection criterion data may be compared to a second type of selection criterion data for a determination of relative importance. For example, both a relationship ranking (i.e., with a gaming provider) and a purchase price of a corresponding advertising campaign may be available for two advertisements. A first advertiser may have paid more than a second advertiser for their respective advertising campaign but the second advertiser may have a higher relationship ranking than the first advertiser. Where the selection criteria has placed a greater value on the relationship ranking over the purchase price of the ad campaign, the advertisement corresponding to the second advertiser will be transmitted to the client device 205 for display. In this way the gaming provider may determine how an advertisement display situation, that would otherwise be conflicting, may be resolved with differentiating information provider in the selection criteria.

An advertiser may want to promote an upcoming event or product release that may be associated with a game. A promotional advertisement may be devised as part of an advertising campaign that may be broadcast to users of the targeted game to entice them to make certain game play activities relating to the upcoming event. For instance, an advertiser may want to promote an upcoming movie and advertise that users that incorporate the word "movie" as a user move in their game play may receive a set of promotional tickets to the opening of the movie as part of a contest. The advertisement may limit the number of users who may qualify for the promotional tickets and the period of time within which the targeted user move may occur in their game play in order to qualify. For instance, a qualifying period of game play within which to play the targeted user move may be set at thirty days from the original date of displaying the advertisement.

When a user plays the word "movie" as a user move a corresponding identifier and time stamp may be entered into the database. At the end of the advertising campaign, a first portion of the users playing a word "movie" are selected and sent a promotional set of tickets. The first portion of users may be, for example, the first one thousand users out of all users submitting the targeted user move during the advertising campaign. Playing the targeted word may also trigger display of a further associated stored advertisement to the user in addition to the initial promotional advertisement. The further stored advertisement may be associated to the targeted user move in the same manner discussed above.

As a further promotion to game play, a user may receive a reward element during the course of playing a game. The reward element may be a letter in a word game, a piece of treasure in a pirate game, or a special clue in an exploration game, for example. The reward element may be played by the user as at least a portion of a user move in a featured portion of game play. For example, the user may use a reward letter tile in a word game toward the spelling of a featured word on a list of featured words. Over the course of game play, many reward letter tiles may have been collected and stored within the user's game play environment. In this case, the user may select at least one reward letter tile from among the just received reward letter tile or a reward letter tile from their stored tiles. If the selected reward letter tiles complete the spelling of the featured word, a further reward may be offered to the user.

Reward elements may also be used in trade and as gifts between users. For example, a first user may decide to have a reward letter tile (or tiles) transmitted to a second user as a gift. The first and the second user may decide to exchange tiles and transmit their respective reward letter tiles to one another. During game play, a user may ask, through in-game messaging, "does anyone have a letter 'P'," for instance and initiate a trade with a positively responding user.

Methods

Figure 3:
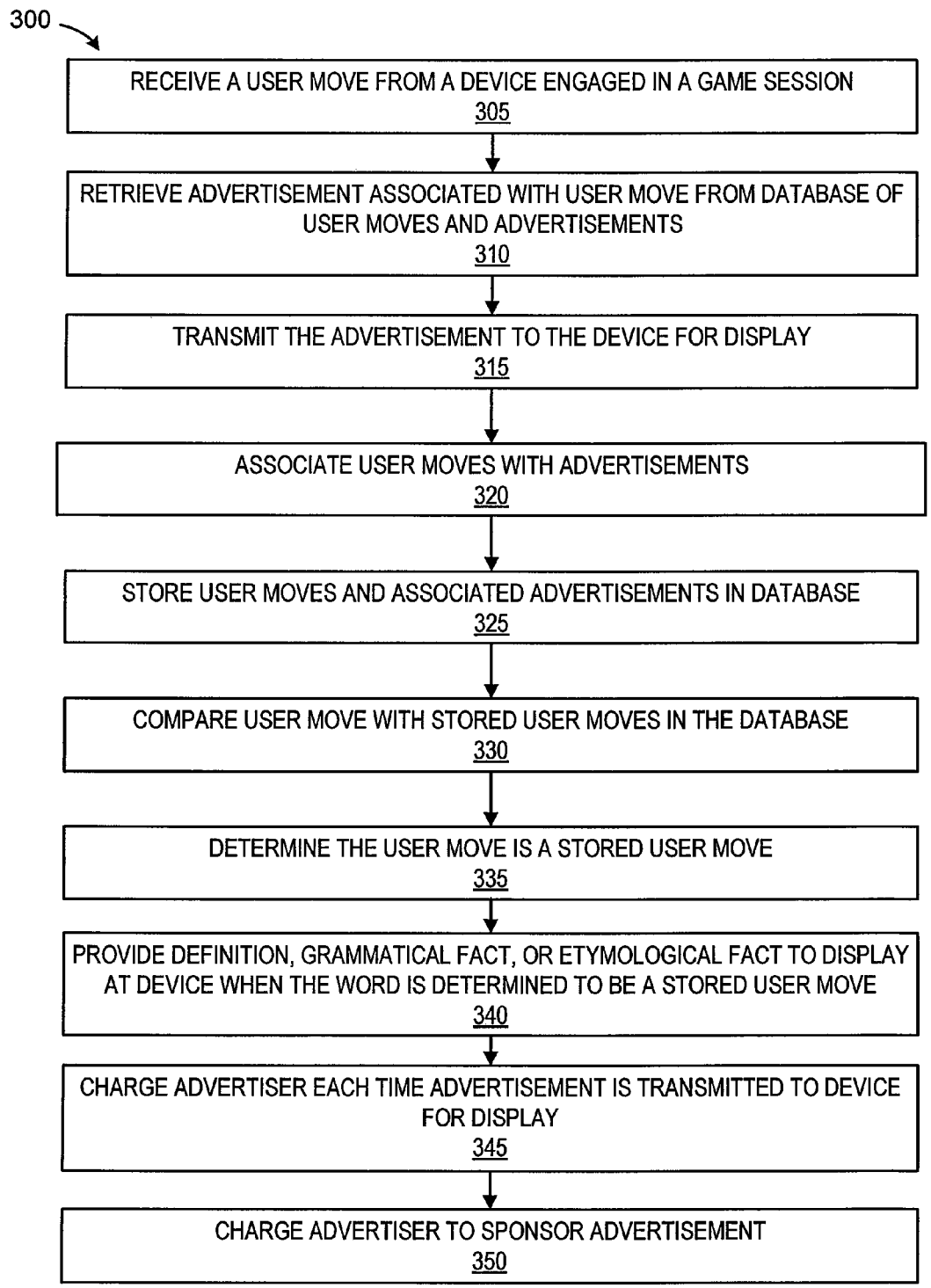
FIG. 3 is a flow chart illustrating a method of providing an advertisement associated with game play content, according to an example embodiment.

FIG. 3 depicts an example method of receiving an advertisement associated with game play content 300 commencing with receiving 305 a user move from a device engaged in a game session and retrieving 310 an advertisement associated with the user move from the database of stored user moves and stored advertisements. The method continues with transmitting 315 the advertisement to a device for display and associating 320 user moves with advertisements. The method goes on with storing 325 user move and associated advertisements in the database and comparing 330 the user move with stored user moves in the database. The method includes determining 335 that the user move is a stored user move and providing 340 at least one of a definition, a grammatical fact, and an etymological fact to be displayed by the device when the user move is determined to be a stored user move. And finally the method concludes with charging 345 an advertiser each time the advertisement is transmitted to a device for display and charging 350 the advertiser to sponsor the advertisement. Alternatively, charging of an advertiser may occur with each transmitted display advertisement that is selected and clicked-through by the user.

Figure 4:
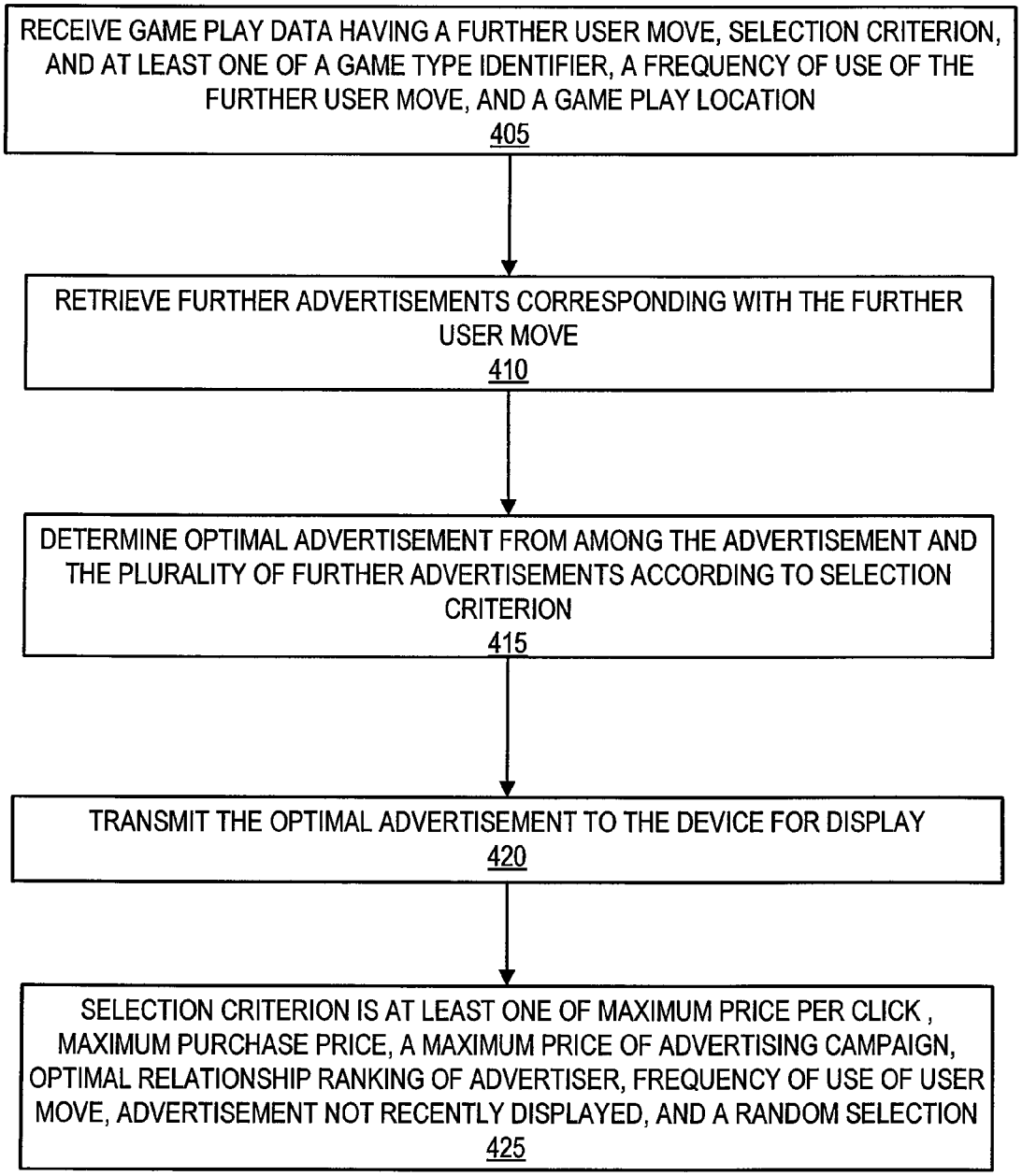
FIG. 4 is a flow chart illustrating a method of determining an optimal game play content-based advertisement for displaying to a device, according to an example embodiment.

FIG. 4 depicts an example method of determining an optimal game play content-based advertisement for displaying to a device 400. The method proceeds with receiving 405 game play data having a further user move, a selection criterion, and at least one of aching type identifier, a frequency of use of the further user move, and a game play location. The method continues with retrieving 410 further advertisements corresponding with the further user move and determining 415 an optimal advertisement from among the received advertisement and the plurality of further advertisements according to the selection criterion. The method concludes with transmitting 420 the optimal advertisement to the device for display where the selection criterion 425 is at least one of a maximum price per click to select the advertisement, a maximum purchase price for the advertisement, a maximum price for and associated advertising campaign, an optimal relationship breaking up the advertiser, the frequency of use of the user move, that the advertisement has not recently been displayed, and a random selection taken from among contending advertisements.

Figure 5:
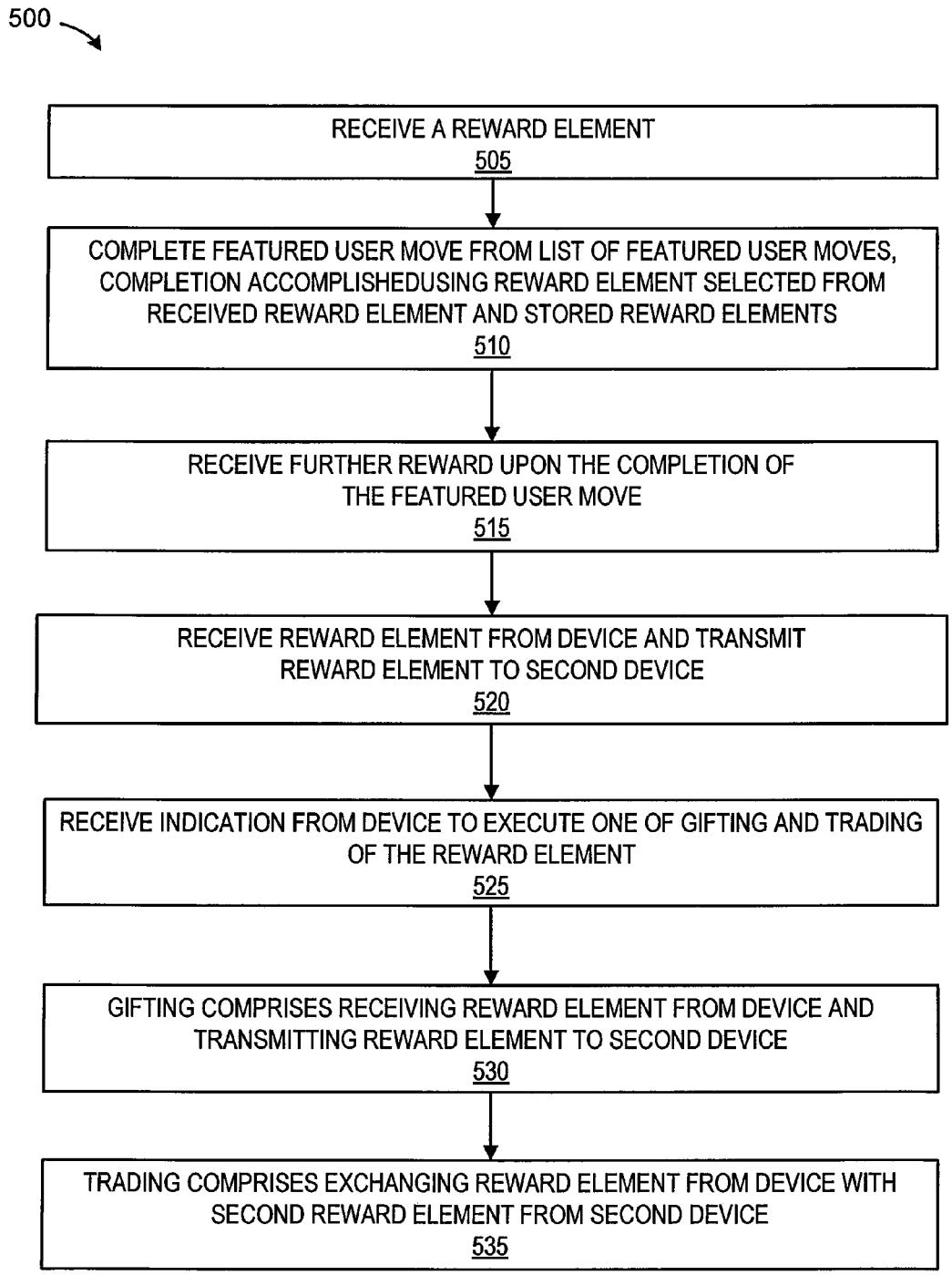
FIG. 5 is a flow chart illustrating a method of promoting further gaming action on the part of users through game play reward incentives, according to an example embodiment.

FIG. 5 depicts an example method of promoting further game play action on the part of users through game play content-based advertising 500. The method proceeds with receiving 505 a reward element and completing 510 a featured user move from a list of featured user moves where the completion of the user move is accomplished using a chosen reward element selected from among the received reward element and previously stored reward elements. The method continues with receiving 515 a further reward upon the completion of the featured user move. The method continues with receiving 520 a reward element from a device and transmitting the reward element to a second device and receiving 525 an indication from the device to execute one of either gifting or trading of the reward element. The method concludes where gifting 530 includes receiving the reward element from the device and transmitting the reward element to the second device and trading 535 includes exchanging the reward element from the device with the second reward element from the second device.

Figure 6:
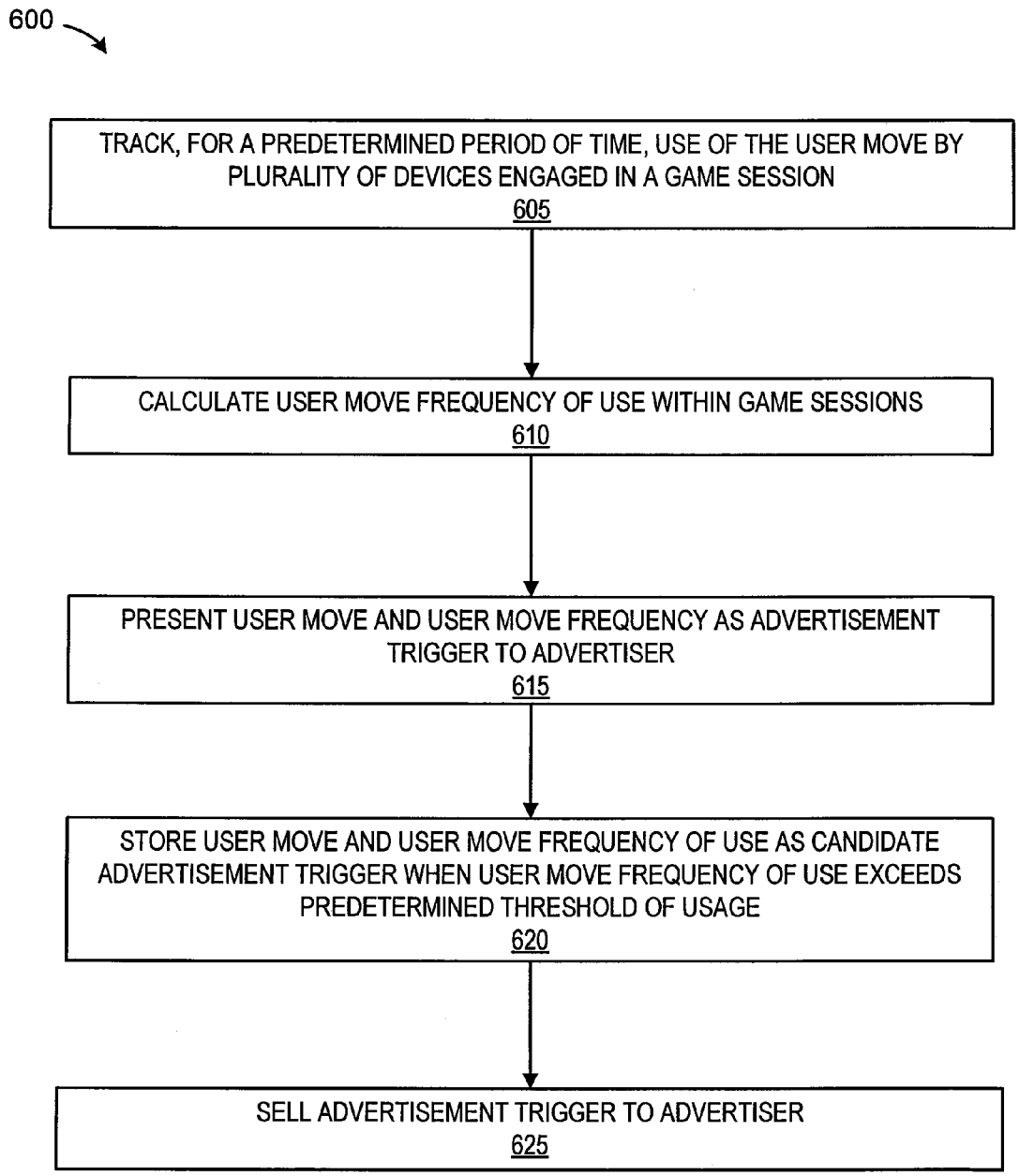
FIG. 6 is a flow chart illustrating a method of preparing a game play content-based advertisement trigger, according to an example embodiment.

FIG. 6 depicts an example method of preparing a user move and frequency of use information as a game play content-based advertisement trigger for sale to an advertiser 600. The method proceeds with tracking 605, for a predetermined period of time, the use of the user move by multiple devices engaged in a game session and calculating 610 the user move frequency of use within the game sessions. The method continues with presenting 615 the user move and user move frequency as an advertisement trigger to an advertiser and storing 620 the user move and user move frequency of use as a candidate advertisement trigger when the user move frequency of use exceeds a predetermined threshold usage. The method concludes with selling 625 the advertisement trigger to an advertiser.

Figure 7:
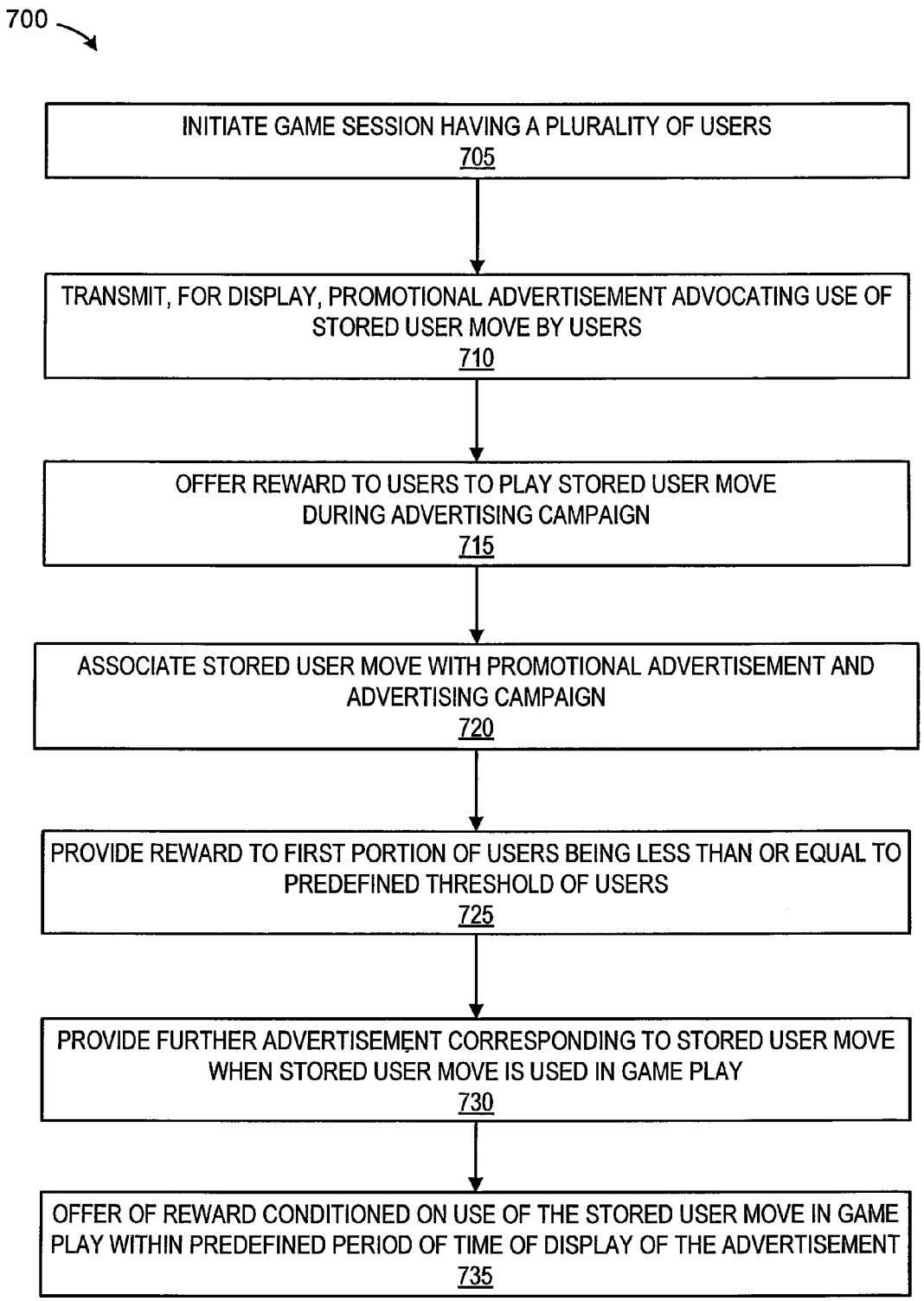
FIG. 7 is a flow chart illustrating a method of producing a promotional advertisement of a targeted user move, according to an example embodiment.

FIG. 7 depicts an example method of producing a game play content-based promotional advertisement to a group of gaming users 700. The method commences with initiating 705 a game session having multiple users and transmitting 710, for display, a promotional advertisement advocating the use of a stored user move by users. The method continues with offering 715 a reward to the users to play the stored user move during an advertising campaign and associating 720 the stored user move with the promotional advertisement and advertising campaign. The method includes providing 725 a reward to a first portion of the users that is less than or equal to a predefined threshold of users and providing 730 a further advertisement corresponding to the stored user move when the stored user move is used in game play. The method concludes with offering 735 the reward conditioned on the use of the stored user move in game play within a predefined period of time of display of the advertisement.

Figure 8:
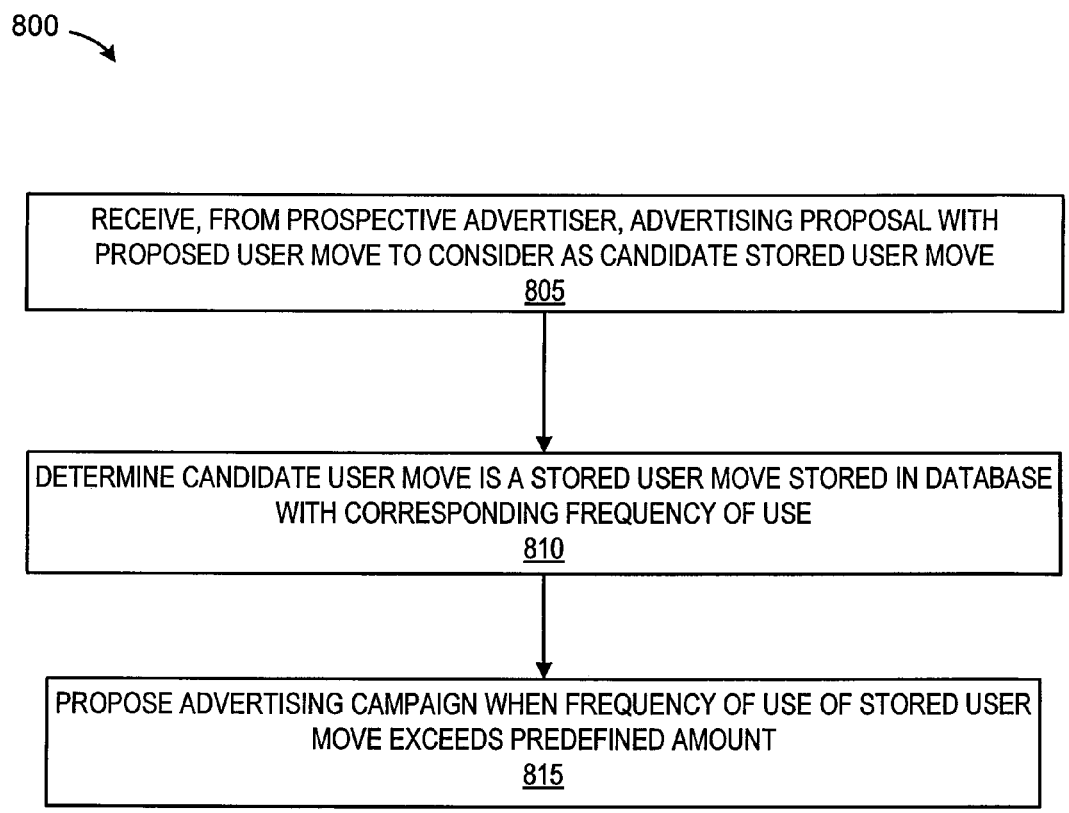
FIG. 8 is a flow chart illustrating a method of developing an advertiser's proposed game play content-based advertising campaign.

FIG. 8 depicts an example method of developing an advertiser's proposed game play content-based advertising campaign 800, The method commences with receiving 805, from a perspective advertiser, and advertising proposal with a proposed user move to be considered as a candidate stored user and determining 810 that a candidate user move is a stored user move stored in the database with a corresponding frequency of use. The method concludes with proposing 815 an advertising campaign when the frequency of use of the stored user move exceeds a predefined amount.

One skilled in the art will readily recognize that where this section has referred to a game session, that game session may be a standalone off-line game session or an online game session conducted through data communications as described above regarding, for example, use of the ad network 235, the game play network 245, and the server network 247 connected between the client device 205, the ad server 210, and the game play server 215, Alternately, the game session may be conducted off-line in a device that may be a self contained or a standalone system. Either implementation may be equally applicable to application of at least the details described herein.

Modules, Components and Logic

Certain embodiments may be described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that may be physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it may be communicatively coupled. A further hardware module may then, at a later time, access the memory device to retrieve and process the stored output. Hardware modules may also initiate communications with input or output devices, and may operate on a resource e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server may generally be remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
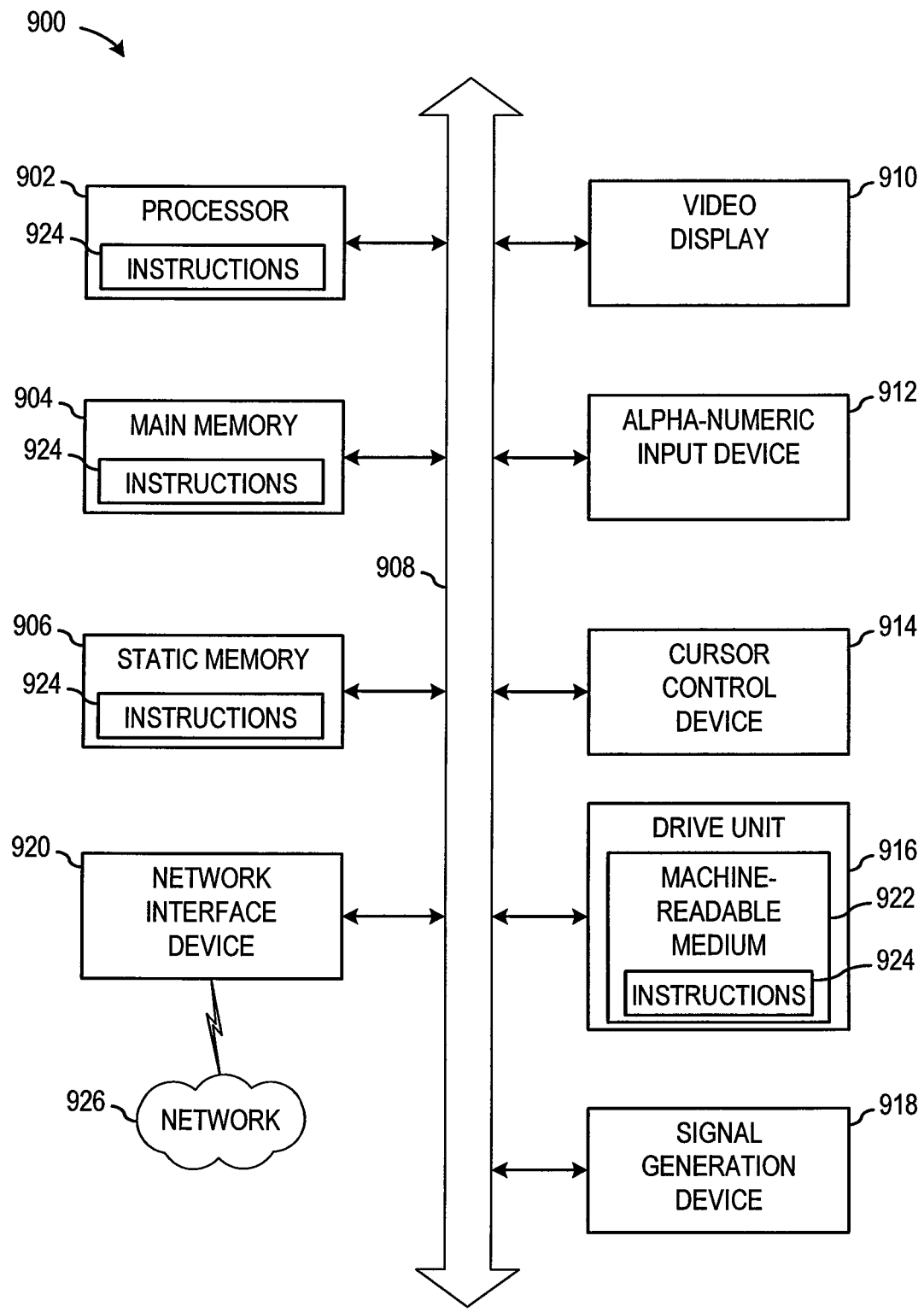
FIG. 9 is a block diagram of a machine in the example form of a computer system within which a set of instructions, for causing the machine to perform any one or more of the methodologies discussed herein may be executed.

FIG. 9 is a block diagram of machine in the example form of a computer system 900 within which instructions for causing the machine to perform any one or more of the methodologies discussed herein, may be executed. In alternative embodiments, the machine operates as a standalone device or may be connected. (e.g., networked) to other machines. In a networked deployment the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 a (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation and cursor control device 914 (e.g., a mouse), a disk drive unit 916, a signal generation device. 918 (e.g., a speaker) and a network interface device 920.

For example, within the computer system 900, the processor 902 may be utilized to facilitate the steps, described above, of comparing the user move with the stored user moves in the database, determining the user move is a stored user move, and determining an optimal advertisement from among the advertisement and the plurality of further advertisements according to the selection criterion. These and any one of the related steps of the methods detailed above may be carried out according to instructions 924 stored in any one of the processor 902, the main memory 904, the static memory 906, and the drive unit 916 (see MACHINE-READABLE MEDIUM below). In further example, the database having stored user moves and associated advertisements may be facilitated in whole or in part in the main memory 904, the static memory 906, and the drive unit 916 or distributed across a combination of these three storage elements.

By way of continuing example, the step of transmitting the advertisement to the device for display may be facilitated by the network interface device 920 being in electrical communication with the processor 902 and the network 926 over the bus 908. By way of additional example, the network interface device 920 and the network 926 may facilitate the steps of receiving a user move from a device engaged in a game session, receiving game play data comprising a selection criterion; and at least one of a game type identifier; a frequency of use of the further user move; and a game play location, and receiving a reward element.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments may be defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one may be in fact disclosed, Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments, Combinations of the above embodiments, and other embodiments not specifically described herein, will be apparent to those of skill in the art upon reviewing the above description.

What is claimed is:

1. A method comprising:
   receiving at a client device advertising information comprising a set of advertisements and a corresponding set of advertisement triggers associated with the set of advertisements;
   responsive to the receipt of the advertising information, pre-caching the advertising information on the client device;
   receiving a play including a selection criterion and a user move-during a game session of a computer-implemented game executed on the client device, the user move comprising a user-selected combination of first letter tiles from a set of letter tiles, the combination of first letter tiles indicating a partial word and being selected from the set of letter tiles in a first succession;
   at the client device, identifying a word indicated by the selected combination of first letter tiles and a second letter tile associated with a previously played user move, the word identified based on a second succession and having a predefined meaning;
   in an automated operation performed by the client device in response to the identifying of the word, retrieving a first advertisement and a second advertisement from the set of advertisements, the first advertisement and the second advertisement each relating to the word indicated by the combination of the first letter tiles and the second letter tile based on a correspondence between the word and a particular advertisement trigger of the set of advertisement triggers;
   using at least one processor of the client device, evaluating, according to the selection criterion, the first advertisement and the second advertisement to produce a first valuation and a second valuation respectively; and
   in response to the evaluating, causing display of the first advertisement at the client device when, according to the selection criterion, the first valuation exceeds the second valuation.

2. The method of claim 1, wherein the selection criterion is one of a set of instructions and a set of standards, the selection criterion being a rule of evaluation to differentiate one advertisement over another according to the evaluating.

3. The method of claim 1, wherein the selection criterion includes one of a maximum advertisement purchase price, a maximum price paid to purchase an advertising campaign including the respective advertisement, and a maximum price per click associated with receipt of a selection indication corresponding to an advertisement.

4. The method of claim 1, wherein the selection criterion includes one of a maximum relationship ranking of an advertiser corresponding to the advertisement and the frequency of use of the user move triggering the advertisement, the relationship ranking indicative of a relationship between a gaming provider and the advertiser.

5. The method of claim 1, wherein the first valuation and the second valuation include one of a monetary amount, a monetary amount per click, a frequency of use, a temporal measure of recency, and a relationship ranking.

6. The method of claim 1, wherein the first advertisement and the second advertisement include a respective advertisement property, wherein the respective advertisement property is at least one of a purchase price, a purchase price of an inclusive advertising campaign, a price per click associated with receipt of a selection indication, a relationship ranking of an associated advertiser, a frequency of use of a triggering user move, and a time since a most recent display.

7. The method of claim 1, wherein the set of advertisement triggers include a set of stored plays, the method further comprising:
   transmitting the plurality of advertisements and the set of stored plays to the client device during a pre-configuration of a game corresponding to the play and prior to initiating an instance of the game.

8. The method of claim 1, wherein the play includes at least one of a further user move, a game type identifier, a corresponding user move frequency of use, and a game play location.

9. A non-transitory machine-readable storage medium including instructions, that when implemented by at least one processor perform operations comprising:
   receiving at a client device advertising information comprising a set of advertisements and a corresponding set of advertisement triggers associated with the set of advertisements;
   responsive to the receipt of the advertising information, pre-caching the advertising information on the client device;
   receiving a play including a selection criterion and a user move-during a game session of a computer-implemented game executed on the client device, the user move comprising a user-selected combination of first letter tiles from a set of letter tiles, the combination of first letter tiles indicating a partial word and being selected from the set of letter tiles in a first succession;
   at the client device, identifying a word indicated by the selected combination of first letter tiles and a second letter tile associated with a previously played user move, the word identified based on a second succession and having a predefined meaning;
   in an automated operation performed by the client device in response to the identifying of the word, retrieving a first advertisement and a second advertisement from the set of advertisements, the first advertisement and the second advertisement each relating to the word indicated by the combination of the first letter tiles and the second letter tile based on a correspondence between the word and a particular advertisement trigger of the set of advertisement triggers;
   using at least one processor of the client device, evaluating, according to the selection criterion, the first advertisement and the second advertisement to produce a first valuation and a second valuation respectively; and
   in response to the evaluating, causing display of the first advertisement at the client device when, according to the selection criterion, the first valuation exceeds the second valuation.

10. The storage medium of claim 9, wherein the selection criterion is one of a set of instructions and a set of standards, the selection criterion being a rule of evaluation to differentiate one advertisement over another according to the evaluating.

11. The storage medium of claim 9, wherein the selection criterion includes one of a maximum advertisement purchase price, a maximum price paid to purchase an advertising campaign including the respective advertisement, and a maximum price per click associated with receipt of a selection indication corresponding to an advertisement.

12. The storage medium of claim 9, wherein the selection criterion includes one of a maximum relationship ranking of an advertiser corresponding to the advertisement and the frequency of use of the user move triggering the advertisement, the relationship ranking indicative of a relationship between a gaming provider and the advertiser.

13. The storage medium of claim 9, wherein the first valuation and the second valuation include one of a monetary amount, a monetary amount per click, a frequency of use, a temporal measure of recency, and a relationship ranking.

14. The storage medium of claim 9, wherein the first advertisement and the second advertisement include a respective advertisement property, wherein the respective advertisement property is at least one of a purchase price, a purchase price of an inclusive advertising campaign, a price per click associated with receipt of a selection indication, a relationship ranking of an associated advertiser, a frequency of use of a triggering user move, and a time since a most recent display.

15. The storage medium of claim 9, wherein the set of advertisement triggers include a set of stored plays, the operations further comprising:
   transmitting the plurality of advertisements and the set of stored plays to the client device during a pre-configuration of a game corresponding to the play and prior to initiating an instance of the game.

16. A system comprising:
   a client device configured to provide game play to a user, the game play including a set of user moves, with each user move comprising a user-selected combination of first letter tiles from a set of letter tiles, the combination of the first letter tiles indicating a partial word and being selected from the set of letter tiles in a first succession;
   a local storage module of the client device configured to store plays, user moves, selection criterion, and advertising information comprising advertisements and advertisement triggers, each stored user move including a combination of the first letter tiles and a second letter tile;
   a determination module, comprising one or more processor of the client device, to determine the word indicated by the selected combination of the first letter tiles and the second letter tile, the word identified based on a second succession and having a predefined meaning; and
   an evaluation module, comprising the one or more processor of the client device, configured to evaluate an advertisement and produce a valuation according to a selection criteria provided during the game play.

* * * * *